US008596574B2

(12) United States Patent  (10) Patent No.: US 8,596,574 B2
Prat et al.  (45) Date of Patent: Dec. 3, 2013

(54) STREAMLINED PROFILE REDUCING THE SPEED DEFICIT IN ITS WAKE

(75) Inventors: Damien Prat, Colomiers (FR); Camil Negulescu, Toulouse (FR); Frederic Barrois, Montgiscard (FR); Bastien Caruelle, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 81 days.

(21) Appl. No.: 13/454,469

(22) Filed: Apr. 24, 2012

(65) Prior Publication Data

US 2012/0273609 A1  Nov. 1, 2012

(30) Foreign Application Priority Data

Apr. 28, 2011 (FR) ...................... 11 53637

(51) Int. Cl.
*B64C 3/00* (2006.01)
(52) U.S. Cl.
USPC ........................ 244/54; 244/123.14
(58) Field of Classification Search
USPC ............ 244/54, 99.12, 123.14, 123.7, 200.1, 244/204, 208
See application file for complete search history.

(56) References Cited

U.S. PATENT DOCUMENTS

| 2,078,854 A | 4/1937 | Jones |
| 2,587,227 A | 2/1952 | Roy |
| 2,833,492 A | 5/1958 | Fowler |
| 3,149,804 A | 9/1964 | Litz, Jr. |
| 4,666,104 A | 5/1987 | Kelber |
| 5,156,353 A | 10/1992 | Gliebe et al. |
| 5,540,406 A * | 7/1996 | Occhipinti .................... 244/200 |
| 2006/0043770 A1* | 3/2006 | Preiss ......................... 296/180.1 |
| 2008/0116717 A1* | 5/2008 | Honeycutt ................. 296/180.5 |
| 2010/0270433 A1* | 10/2010 | Miller et al. .................. 244/204 |

FOREIGN PATENT DOCUMENTS

| GB | 869065 | 5/1961 |
| GB | 2 203 710 A | 10/1988 |
| WO | WO 91/09776 A1 | 7/1991 |

OTHER PUBLICATIONS

French Preliminary Search report issued on Nov. 23, 2011 in corresponding French Application No. 11 53637 filed on Apr. 28, 2011 (with an English Translation of Categories).

* cited by examiner

*Primary Examiner* — Timothy D Collins
*Assistant Examiner* — Jessica Bowen
(74) *Attorney, Agent, or Firm* — Oblon, Spivak, McClelland, Maier & Neustadt, L.L.P.

(57) ABSTRACT

A streamlined profile reducing the speed deficit in a wake, a pylon with such a profile, a propulsion assembly including such a pylon and an aircraft including this assembly. The profile has a device for suction of air from the boundary layer formed on this profile. This suctioned air is discharged with the aid of a nozzle the outlet of which is situated close to the trailing edge of the profile. Suction of the air and discharge thereof contribute to reducing the speed deficit downstream from the profile and therefore to reducing the turbulences in this zone.

8 Claims, 2 Drawing Sheets

STREAMLINED PROFILE REDUCING THE SPEED DEFICIT IN ITS WAKE

BACKGROUND OF THE INVENTION

1. Field of the Invention

The invention relates to a streamlined profile reducing the speed deficit in its wake, a pylon comprising such a profile, a propulsion assembly including such a pylon and an aircraft comprising such a profile or such a propulsion assembly.

During a flight, the pylon bearing the engine generates a wake, and this irrespective of the design of the pylon.

This is due in particular to the fact that since the height of the boundary layer of its profile increases in the direction downstream from the profile, a "speed deficiency" occurs at the trailing edge, expressed by a difference between the speed of the free air flow and the local speed of the air in the zone downstream from the profile.

The zone having this speed deficiency also is the seat of an air "mass flow deficiency." For this reason, the air has a tendency to be carried along in the zone with speed deficiency, thus causing turbulences.

The discontinuity of the speeds and the turbulences of the wake cause, among other things, an increase in the noise generated by the propellers of the turbine that may impair the comfort of the passengers and the environment. They also cause vibrations increasing the fatigue sustained by the engine, the systems carried in the pylon and the actual structure of the aircraft.

2. Description of the Related Art

Solutions have been developed in the past to remedy this speed deficit of the wake of the pylon.

One of them, set forth in particular in the document U.S. Pat. No. 5,156,353, consists in blowing air from a high-pressure source close to the trailing edge of the profile of the pylon so as to eliminate the air-flow deficit and therefore reduce the speed deficit.

This solution, however, involves the need to carry out a substantial drawing of pressurized air from a component of the aircraft such as the engine compressor, which has the effect, among other things, of complicating its design.

Another disadvantage of this solution lies in the need to provide a system of pipes conveying the air from the compressor to the trailing edge of the profile of the pylon, which complicates the design even more and is expressed by an additional weight.

BRIEF SUMMARY OF THE INVENTION

The invention proposes to remedy at least one of the above drawbacks.

The invention thus firstly has as an object a propulsion assembly of an aircraft comprising at least one pylon and a propulsion system comprising a thrust propeller situated downstream from the said pylon, the said pylon bearing the said propulsion system and comprising a streamlined profile reducing the speed deficit in its wake, the profile comprising a device for suctioning air ("scoop inlet" in English terminology) from a boundary layer which is formed on this profile, the said device comprising an opening end that comprises a discharge nozzle the outlet of which is situated close to the trailing edge of the profile.

The drawing of air from the boundary layer makes it possible to reduce the speed deficit. Discharge of this suctioned air close to the trailing edge of the profile also contributes to reducing the speed deficit (by streamlined profile there is understood here a surface subjected to stresses due to the ambient air). In this way, the speed profile is made uniform, which makes it possible to reduce the interactions between the wake of the profile and a component situated downstream from the profile, for example a propeller.

Consequently it is not necessary to provide a complex piping system or to draw air from an outside source, the suctioned air advantageously being reused.

So as to compensate the total pressure deficit of the suctioned boundary layer, the discharge nozzle is equipped with means for accelerating the discharged air, such as ejectors.

In this way, in the event that the speed deficit of the wake of the profile might not be entirely compensated by discharge of the suctioned air, the acceleration means make it possible to remedy this while requiring only a small energy supply.

So that the air intake may eliminate a substantial part of the boundary layer of the profile, the suction device is designed so that the pressure at the outlet of the discharge nozzle is more or less equal to the atmospheric pressure.

So as to increase the volume of suctioned air, the air suction device comprises at least one air intake that extends over the entire dimension crosswise to the chord of the profile, referred to as span of the profile.

According to a possible characteristic, the air intake of the device is situated on the lower and/or the upper surface of the profile.

In order to suction a substantial part of the boundary layer of the profile, the said at least one air intake of the profile is positioned at a distance from its leading edge ranging between 80% and 90% of its chord.

The Applicant estimated that at low speed, total pressure losses in the boundary layer at the air intake are approximately 1% to 2%. Moreover, a total pressure loss of 1% is estimated in the suction device. The acceleration means of the nozzle therefore compensate for the total pressure losses up to 2% to 3%.

The Applicant also estimated that under takeoff conditions (low speed) the boundary layer is approximately 30 to 40 mm high at the air intake. The height of the said at least one air intake of the profile according to the invention thus ranges more or less between 30 mm and 40 mm.

Advantageously, the length or span of the air intake of the profile of the pylon is adapted to the height of the blades of the said propeller.

Since the propulsion assembly according to the invention is not limited to takeoff conditions, but also may be designed for cruising conditions, the design of the profile results from a compromise between high- and low-speed flight conditions.

The invention also relates to an aircraft comprising a propulsion assembly according to the invention.

BRIEF DESCRIPTION OF THE DRAWINGS

Other characteristics and advantages will become apparent in the course of the description that is going to follow, provided by way of non-limitative example and presented with reference to the attached drawings, on which

DETAILED DESCRIPTION OF THE INVENTION

Figure 1:
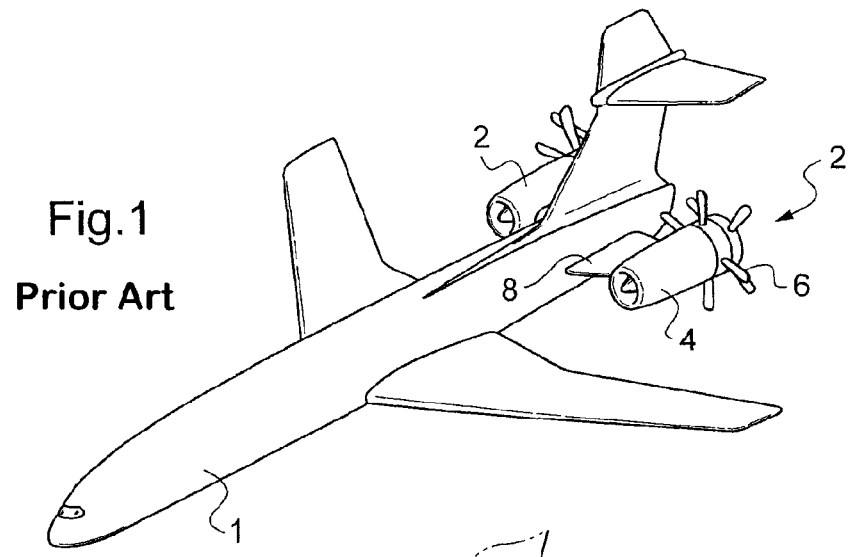
FIG. 1 is a schematic view in perspective of an airplane powered by two contrarotative propeller engines mounted downstream from the wings thereof.

FIG. 1 (prior art) illustrates an airplane fuselage 1 comprising a propulsion system 2 comprising an engine contained in a nacelle 4 and thrust propellers 6. A single propeller per propulsion system also may be contemplated.

This nacelle 4 is supported and connected to fuselage 1 by a pylon 8. The term pylon here refers to a streamlined fairing encompassing the structure bearing the propulsion means and the devices that may be connected thereto. The latter are not shown.

Figure 2:
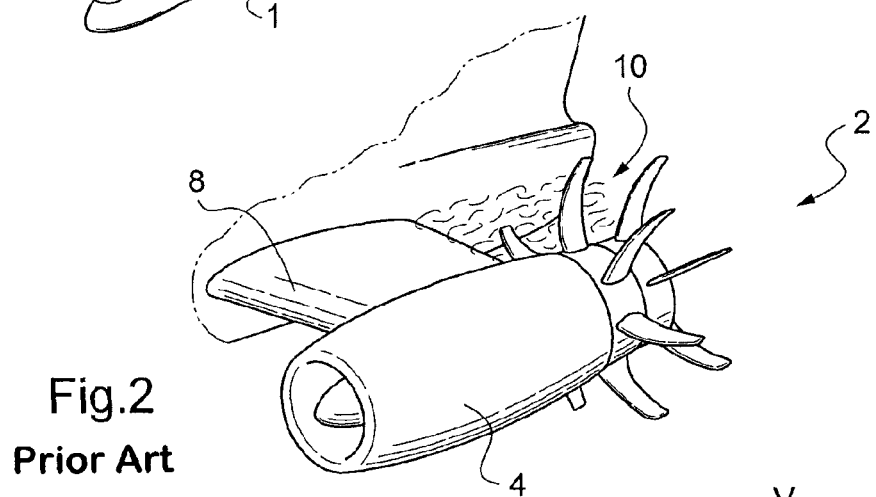
FIG. 2 is a schematic view in perspective of a detail of FIG. 1, comprising the zone subjected to the eddy caused by a pylon bearing one of the engines.

As explained above, during flight, pylon 8 causes eddies in its wake 10 and turbulences illustrated on FIG. 2.

Figure 3:
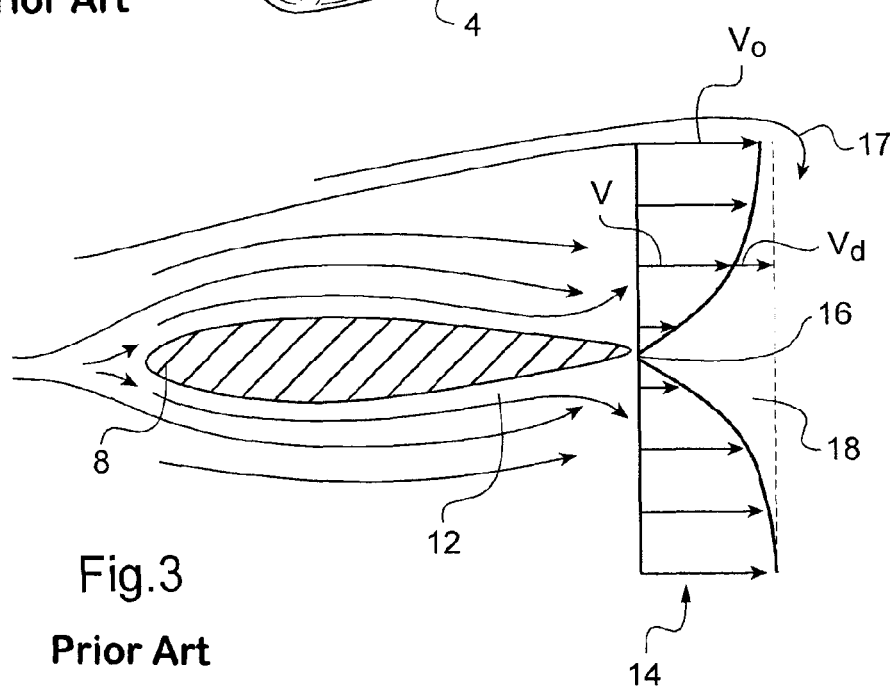
FIG. 3 is a schematic view of a section of the streamlined profile of the pylon of FIG. 2, also comprising the viscous boundary layer on its surface and the air speed profile downstream therefrom.

FIG. 3 illustrates the fact that the thickness of boundary layer 12 gradually increases in the direction downstream from the profile of pylon 8, which leads to streamlined speed profile 14.

Speed profile 14 at trailing edge 16 of pylon 8 has a speed deficiency $V_d$ in zone 18 situated downstream from pylon 8. This speed deficiency corresponds to the difference between the speed of free flow $V_0$ and the local speed V in the example considered on FIG. 3.

Zone 18 having this speed deficiency also has a "mass flow deficiency" which results in carrying along the air there as course 17 illustrates.

A solution of the prior art described in the document U.S. Pat. No. 5,156,353 and attempting to remedy the speed deficiency is shown on FIG. 4.

According to this design, pylon 8 comprises a manifold 20 to which there is supplied air under pressure originating, for example, from the compressor of the engine of the aircraft (not shown). Manifold 20 is connected to a duct 22 blowing this air, in the form of a jet, close to trailing edge 16.

This air jet raises the overall speed of the air in zone 18, so that obtained speed profile 24 has a reduction in speed deficiency.

Nevertheless, as was explained above, the presence and operation of manifold 20 brings about in particular an increase in weight of the aircraft, which is not desirable.

Figure 5:
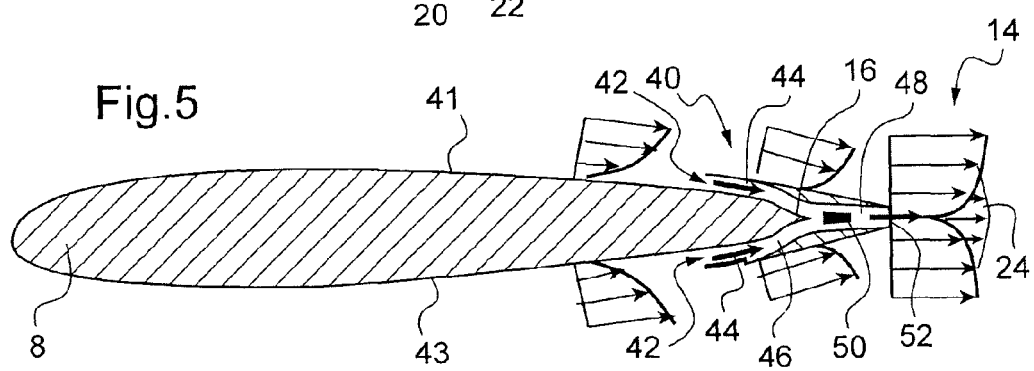
FIG. 5 is a schematic view of a section of the streamlined profile of the pylon of FIG. 2 equipped with a suction device according to one embodiment.
Figure 6:
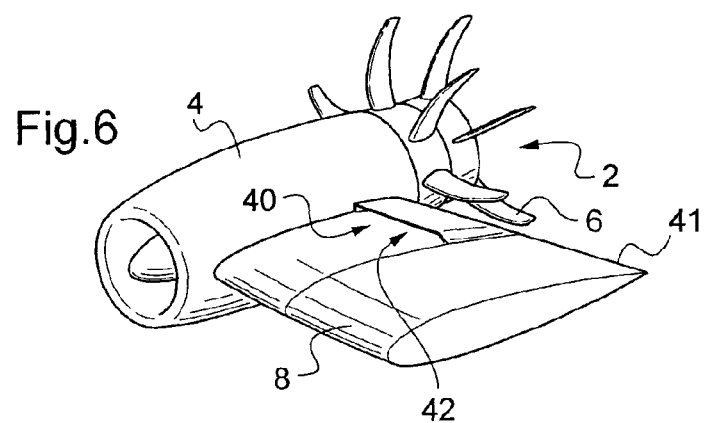
FIG. 6 is a schematic view in perspective of the nacelle of an engine with contrarotative propellers connected to a pylon equipped with a suction device.
Figure 7:
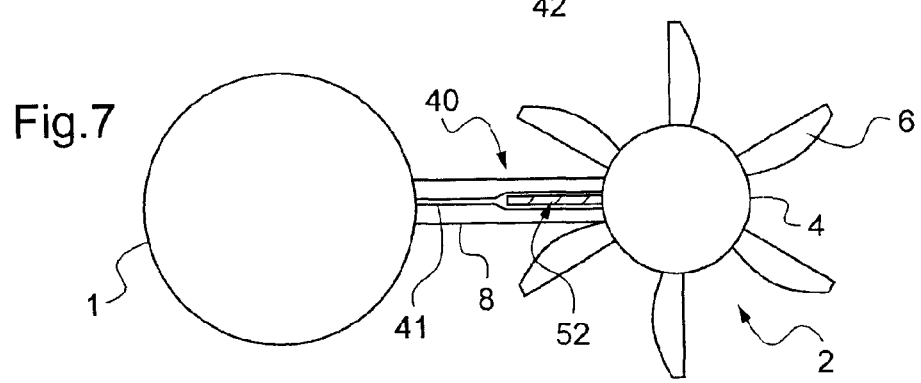
FIG. 7 is a schematic view in section of the fuselage of an airplane seen from the rear, comprising an engine with contrarotative propellers the nacelle of which is connected to the fuselage by a pylon equipped with a device according to the invention.

The streamlined profile that is the object of the invention is shown on FIGS. 5, 6 and 7.

This profile has two suction devices 40 situated on its upper surface 41 (on its lower surface 43 respectively) and the air intakes 42 of which, a few centimeters in height, open into two ducts 44 disposed on both sides of trailing edge 16. However, a single suction device situated either on the upper surface or on the lower surface, makes it possible to reduce the speed deficit.

The fact of suctioning air from the boundary layer according to path 46 makes it possible to reduce the speed deficit of profile 14.

Ducts 44 convey air into a discharge nozzle 48 that may comprise acceleration means 50 opening close to trailing edge 16.

The air suctioned in this way is discharged close to trailing edge 16. This discharge of air also contributes to the reduction of the speed deficit without significant input of energy or drawing of compressed air from the engine. In fact, suction device 40 is designed so that the pressure of discharged air 52 is more or less equal to the atmospheric pressure, which proves to be sufficient for obtaining a decrease in the speed deficit.

According to experiments conducted by the Applicant, at low speed, the total pressure losses of the boundary layer at the intake of the suction device will range between 1% and 2%. Moreover, a total pressure loss of 1% is estimated in ducts 44 and nozzle 48.

Acceleration means 50 of discharge nozzle 48 therefore are designed to compensate the total pressure losses up to 2% to 3%.

So as to optimize the suction of the air, device 40 is situated more than halfway through the chord of pylon 8 and preferably at between 80% and 90% of the total chord of pylon 8. It may extend over a part or the entire length of trailing edge 47 of pylon 8.

So as to suction the entire boundary layer, the height of air intake 42 ranges more or less between 30 mm and 40 mm for a pylon 3 meters in length.

In this way, the supply for acceleration means 50 is the only energy input necessary for obtaining speed profile 24 compensating the speed deficit presented by speed profile 14.

Figure 4:
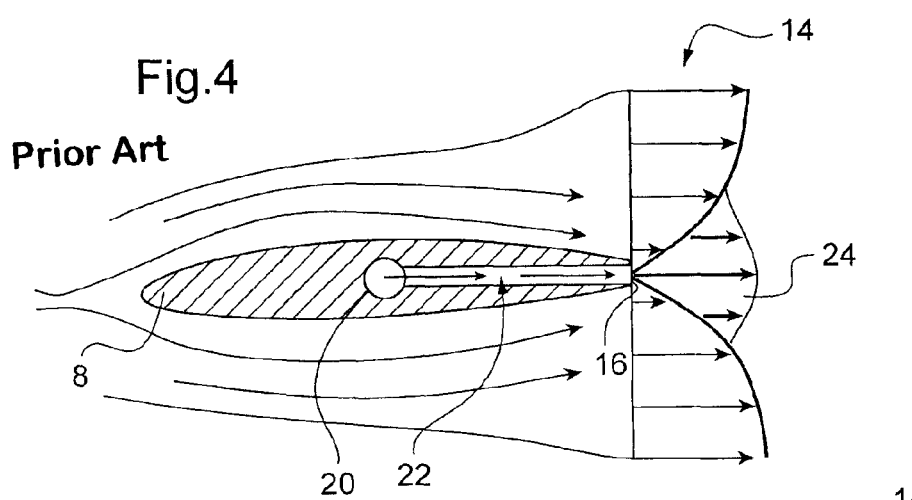
FIG. 4 is a schematic view of a section of the streamlined profile of the pylon of FIG. 2 equipped with a device of the prior art described in the document U.S. Pat. No. 5,156,353.

Moreover, these acceleration means consume little and do not require a piping system as imposing as those for the system shown on FIG. 4.

As shown on FIG. 6, in order to increase the performance of the device, the length of air intake 42 of device 40 preferably is adapted to the length of propellers 6.

The invention claimed is:

1. A propulsion assembly for an aircraft comprising at least one pylon and a propulsion system comprising a thrust propeller downstream from the pylon, the pylon configured to support said propulsion system,
   wherein a profile of the pylon is streamlined to reduce a speed deficit in a wake of the pylon,
   said pylon comprising a scoop inlet device for suction of air from a boundary layer formed on the profile of the pylon,
   said scoop inlet device including an opening end that comprises a discharge nozzle, wherein an outlet of the discharge nozzle is situated at a trailing edge of the profile of the pylon.

2. The propulsion assembly according to claim 1, wherein the scoop inlet device is configured such that a pressure at the outlet of the discharge nozzle is substantially equal to an atmospheric pressure.

3. The propulsion assembly according to claim 1, wherein the scoop inlet device comprises at least one air intake that extends in a direction crosswise to a chord of the profile of the pylon, over a full span of the profile of the pylon.

4. The propulsion assembly according to claim 1, wherein the pylon has a lower surface and an upper surface, and wherein the scoop inlet device comprises at least one air intake situated on at least one of the lower surface or the upper surface of the profile of the pylon.

5. The propulsion assembly according to claim 1, wherein the scoop inlet device includes at least one air intake positioned away from a leading edge of the pylon at a distance from a leading edge of the pylon ranging between 80% and 90% of a chord of the pylon profile.

6. The propulsion assembly according claim 5, wherein a height of said at least one air intake is substantially between 30 mm and 40 mm.

7. The propulsion assembly according to claim 1, wherein a length of the profile of the pylon is substantially equal to a height of blades of said propeller.

8. An aircraft comprising the propulsion assembly according to claim 1.

* * * * *